H. W. VAN TILBURG.
AUTOMOBILE SECURING DEVICE.
APPLICATION FILED JUNE 17, 1920.
1,424,957.
Patented Aug. 8, 1922.
2 SHEETS—SHEET 1.
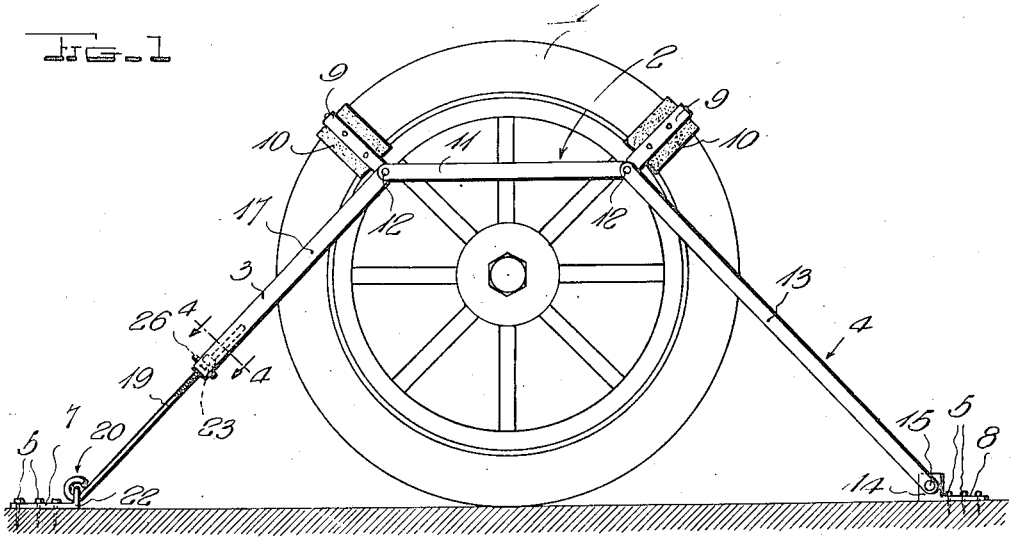
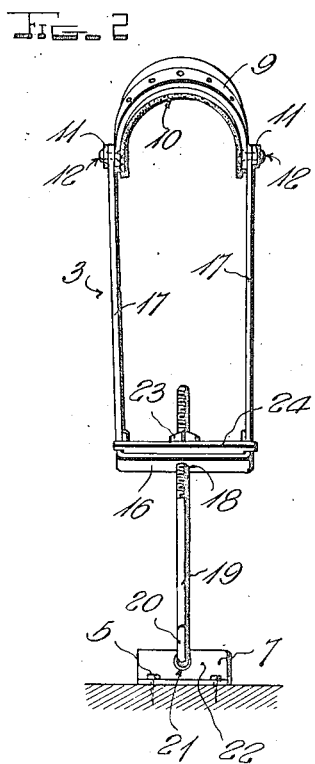
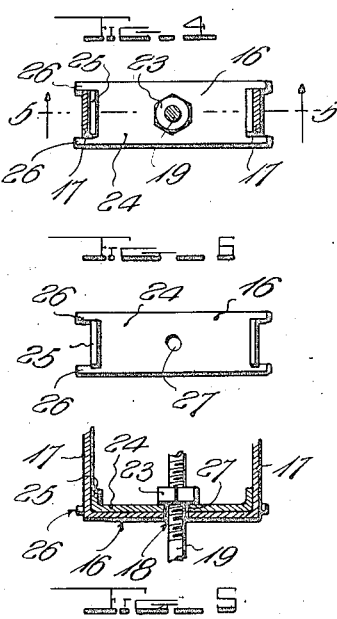
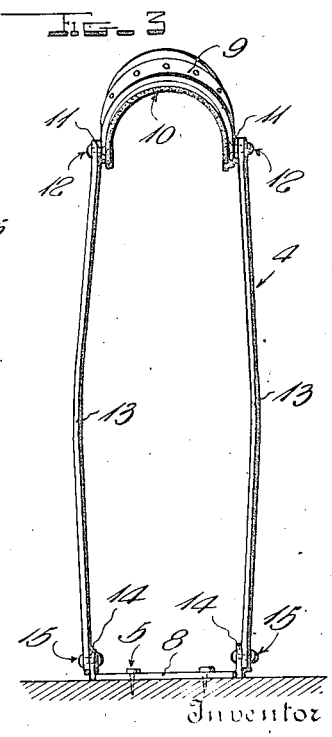
Inventor
H. W. Van Tilburg H. W. VAN TILBURG.
AUTOMOBILE SECURING DEVICE.
APPLICATION FILED JUNE 17, 1920.
1,424,957.
Patented Aug. 8, 1922.
2 SHEETS—SHEET 2.
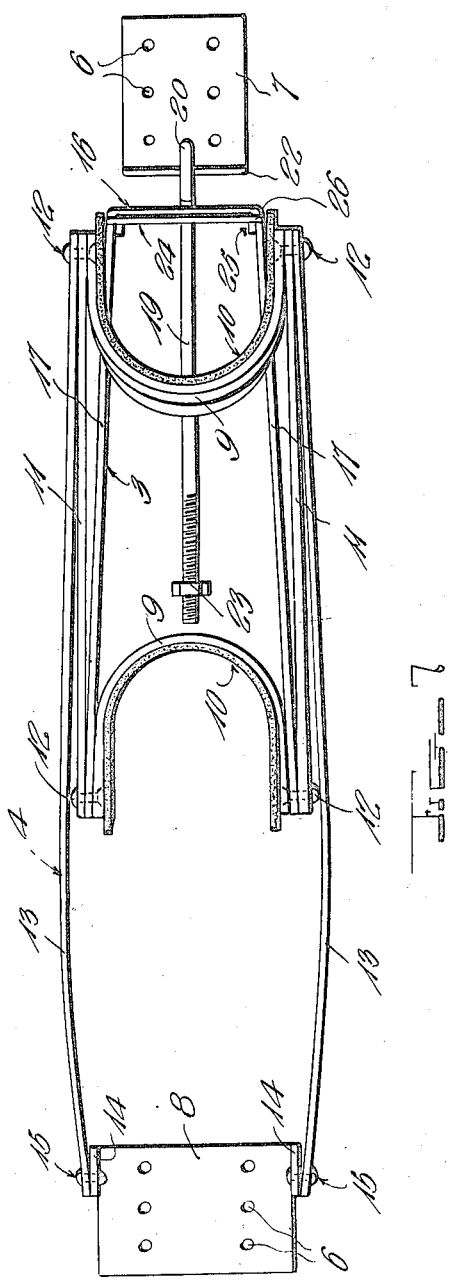
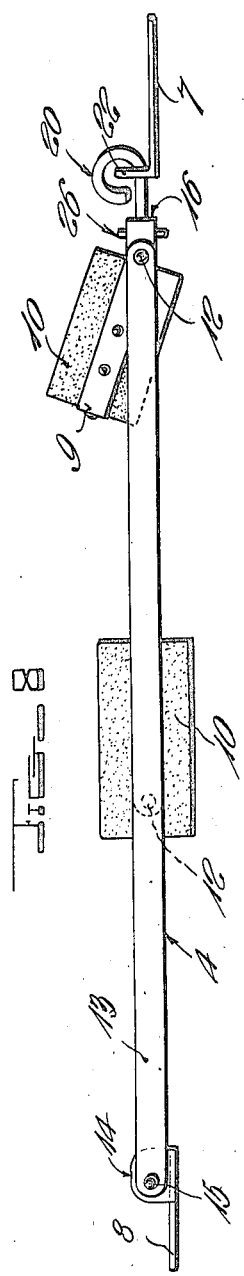
Inventor
H. W. Van Tilburg

UNITED STATES PATENT OFFICE.

HARRY W. VAN TILBURG, OF ELKHART, INDIANA.

AUTOMOBILE SECURING DEVICE.

1,424,957.  Specification of Letters Patent.  Patented Aug. 8, 1922.

Application filed June 17, 1920. Serial No. 389,636.

*To all whom it may concern:*

Be it known that I, HARRY W. VAN TILBURG, a citizen of the United States, residing at Elkhart, in the county of Elkhart and State of Indiana, have invented certain new and useful Improvements in Automobile Securing Devices; and I do declare the following to be a full, clear, and exact description of the invention, such as will enable others skilled in the art to which it appertans to make and use the same.

This invention relates to an improved securing device for use in connection with an automobile and one object of the invention is to provide an improved device which may be connected with the floor of a freight car and engage the wheel of an automobile, a similar device being provided for each wheel and thus the automobile securely held in place and prevented from having movement when the freight car is started or brought to a stop.

Another object of the invention is to so construct this securing device that it may be put in place upon the wheel and then connected with the floor, after which the device will be tightened and brought into tight engagement with the wheel.

Another object of the invention is to so construct this device that its intermediate portion may embrace the upper portion of a wheel and its end portions or sections extended in diverging relation and connected with the floor of the car, one of the end portions including a device for tightening the structure and holding the same in firm engagement with the wheel.

Another object of the invention is to so construct this device that it may be formed principally of strips of metal pivotally connected and thus permit the device to be very cheaply produced and at the same time provide a strong and durable device.

Another object of the invention is to so construct this device that it may be folded into a compact mass and thus take up a relatively small amount of space when put away or returned to the shipper of the automobile.

This invention is illustrated in the accompanying drawings, wherein:

Figure 1 is a side elevation showing the improved securing device connected with an automobile wheel, Figure 2 is a view showing the improved device in end elevation and looking from the left hand side of Fig. 1, Figure 3 is a similar view looking from the opposite side of Fig. 1, and certain portions of the device being omitted for the sake of clearness, Figure 4 is a sectional view taken along the line 4—4 of Figure 1, Figure 5 is a sectional view taken along the line 5—5 of Fig. 4, Figure 6 is a plan view of the plate through which the truss rod passes, Figure 7 is a top plan view of the device in the folded position, and Figure 8 is a side elevation of the device when folded.

This improved securing device is intended to engage the wheel of the automobile as shown in Fig. 1 and when in place will securely hold the wheel against rolling movement and thus prevent the automobile from moving forwardly or rearwardly. In the illustration, the device has only been shown applied to one wheel which is indicated by the numeral 1 but it is to be understood that one of these devices will be provided for each of the wheels, the devices, of course, being of a duplicate construction. This device is provided with an intermediate section indicated in general by the numeral 2 and end sections indicated in general by the numerals 3 and 4. The intermediate section engages the wheel as shown and the end sections extend from the intermediate section in diverging relation and will be connected with the floor of the car by nails or other removable fasteners 5 which pass through openings 6 formed in the bracket plates 7 and 8. The intermediate section 2 of this securing device is provided with tire engaging stirrups 9 which are curved longitudinally to conform to the transverse contour of an inflated tire and carry protecting strips 10 which will be formed of leather, felt or any other suitable material which will prevent the stirrups from scratching the wheel rims or cutting the tires. Links 11 connect the stirrups 9 and are loosely connected with the stirrups by rivets 12 so that the stirrups may have pivotal movement and thus properly engage the tire as shown in Figure 1.

The end section 4 is formed of strips or bars 13 which are pivotally secured at their inner ends by the rivets 12 at the adjacent end of the intermediate section. The outer end portions of these strips 13 are connected with the side ears 14 of the anchoring plate 8 by means of rivets 15 and it will thus be seen that the strips 13 may move to the proper angle when the device is in engagement with the wheel. The second end portion 3 is provided with a yoke 16 having its side arms 17 pivotally connected with the intermediate section by the rivets 12 at the adjoining end of the intermediate section and this yoke has its head provided with an opening 18 to receive the truss rod 19. This truss rod has one end portion bent to form an eye 20 which is mounted in an opening 21 formed in the flange 22 of the bracket 7 and the truss rod has its free end portion threaded to carry a securing nut 23 which will be turned when it is desired to tighten or loosen the fastener. A plate 24 is positioned between the arms of the yoke 16 and cut to provide tongues 25 for engaging the arms 17 and side fingers 26 for engaging the edge faces of these arms and preventing the plate from having pivotal movement upon the truss rod 19 which extends through the opening 27 of this plate. In addition to preventing the plate from having pivotal movement, the tongues 25 and fingers 26 guide the sliding movement of the plate and prevent it from having any tendency to bind as it moves. Ordinarily this plate would have no movement as it is engaged by the nut 23 but when the device is not in use, this plate will not be held in position by the nut and it may have movement between the arms of the yoke.

When this device is in use, the automobile which is being shipped from the factory will be placed in a box car and one of the devices will be connected with each of the wheels. The wheel will pass between the links 12 and side strips 13 and 17 and the stirrups will straddle the tire as shown in Fig. 1. By having the stirrups 13 and 17 straddling the tire and pivotally mounted, these stirrups may engage tires of different diameters and may be swung to proper positions for having flat contact with the tires when the securing device is placed under tension. The stirrups cannot move transversely of the tire since they extend across the tread portion thereof and along the sides. It will thus be seen that the device will have a very good engagement with the tire when in use. After the device has been put in place upon the wheel, the brackets 7 and 8 will then be secured to the floor by the removable fasteners 5 which may be nails or screws and the truss rod 19 then tightened by turning the nut 23. The securing device will thus be drawn into tight engagement with the wheel and the wheel will be prevented from rotating, thus preventing the automobile from having forward or rearward movement when the car comes to a stop or starts to move. It very often happens that when a freight train is started or brought to a stop, the cars will be severely jolted, this being particularly true when making up a train, and if it were not for the provision of means for holding the wheels against rotation, the automobile would tend to move in the car. When it is desired to remove the automobile from the box car, it is simply necessary to loosen the truss rod 19 by turning the nut 23 in the proper direction. This rod can be entirely disconnected from the yoke 16 and the nut then replaced to prevent of its being lost or it can be only loosened a sufficient amount to permit easy removal of the bracket plates 7 and 8. After the securing devices have been removed, they may be folded as shown in Figures 7 and 8. The securing devices will thus take up a very small amount of space when not in use and may be put away until they are again to be used or they may be packed in a relatively small package and returned to the shipper. It will thus be seen that there has been provided a securing device of the character described which is simple in construction, cheap to produce and very efficient in operation.

What is claimed is:

1. A securing device for an automobile comprising a wheel embracing device having an intermediate section and end sections, the intermediate and end sections having side strips pivotally connected and extending upon opposite sides of a wheel when in use, U-shaped stirrups connected with the end portions of the intermediate section for extending about and engaging a tire, a floor plate pivotally connected with one of the end portions, a second floor plate, and a truss rod loosely connected with the second floor plate and adjustably connected with the second end section.

2. A wheel engaging securing device for an automobile comprising an intermediate section having spaced side strips, end sections having spaced side strips pivotally connected with the end portions of the intermediate side strips, tire engaging stirrups pivotally mounted by the means pivotally connecting the side strips of the end sections with the side strips of the intermediate section, a floor engaging element having one of the end sections pivotally connected therewith, a second floor engaging element, and a tensioning element connected with the second floor engaging element and having engagement with the second end section.

3. A wheel engaging securing device for an automobile comprising an intermediate section, end sections pivotally connected with the end portions of the intermediate section, tire engaging stirrups pivotally mounted by the means connecting the end sections with the intermediate section, floor plates having the end sections pivotally connected therewith and one of said end sections having inner and outer portions adjustably connected for drawing the securing device into an operative position with the stirrups in tight engagement with a tire and wheel.

4. A wheel engaging securing device for an automobile comprising an intermediate section, end sections, tire engaging stirrups, means pivotally connecting the stirrups and end sections with the end portions of the intermediate section, a floor engaging element connected with one of the end sections, a second floor engaging element, a truss rod loosely connected with the second floor engaging element, and means adjustably carried by the truss rod for engaging the second end section and adjustably connecting the truss rod with the second end section.

5. A wheel engaging securing device for an automobile comprising an intermediate section and end sections, and wheel engaging elements connected with the intermediate section, one of the end sections being U-shaped and having its cross head provided with an opening, a plate positioned between the arms of the end sections and having an opening for registering with the opening of the cross head and provided with tongues for engaging the arms, a floor engaging element connected with the second end sections, a second floor engaging element, a truss rod carried by the second floor engaging element and extending through the registering openings of the plate and cross head, and a securing nut screwed upon the threaded end portion of the truss rod and engaging the plate.

6. A structure of the character set forth, comprising a pair of members spaced apart and connected together and straddling the wheel to be secured, and members operatively connected with said first-named members and inclining downwardly in opposite directions from the center of the wheel, the outer ends of said second-named members being attachable to the support upon which the wheel rests, for placing the structure under tension.

7. A structure of the character set forth, comprising a pair of members spaced apart and straddling the wheel to be secured, and means arranged at opposite sides of the wheel and connected with said members to form therewith a structure adapted to be held down on the wheel under considerable tension and which will not slip laterally off the wheel, and means for attaching said structure to the support on which the wheel rests, to place said members under tension.

8. A structure of the character set forth, comprising a pair of members spaced apart and straddling the wheel to be secured, and means arranged at opposite sides of the wheel and connecting said members together at opposite sides of the wheel and presenting free end portions, and means for attaching the said free end portion to the support on which the wheel rests, to place said members under tension.

9. A structure for the purpose set forth, comprising a pair of members spaced apart and adapted to straddle the wheel to be secured, members at opposite sides of said wheel and connected with the adjacent ends of said first-named members, and members connected with the structure formed of said first and second referred to members, at opposite sides of the wheel and adapted to incline downwardly in opposite directions from the center of the wheel, and means for attaching said last-named members to the support on which the wheel rests, to place the structure under tension.

10. A structure for the purpose set forth, comprising a pair of members spaced apart, and straddling the wheel at opposite sides of the vertical transverse plane of the center of the wheel, and members connecting said first-named members together at opposite sides of the wheel and having portions which extend from said first-named members at opposite sides of the wheel and across the faces of the wheel, the outer ends of said second-named members being attachable to the support upon which the wheel rests for placing the structure under tension.

In testimony whereof I have hereunto set my hand in the presence of two subscribing witnesses.

HARRY W. VAN TILBURG.

Witnesses:
  JAMES P. DODGE,
  GRETA CLARK.